United States Patent [19]

Bosyk

[11] 3,734,664
[45] May 22, 1973

[54] SOLENOID OPERATED DOOR OPENER FOR PLASTIC MOLDING MACHINES

[75] Inventor: William Bosyk, Holyoke, Mass.

[73] Assignee: Package Machinery Company, East Longmeadow, Mass.

[22] Filed: Oct. 19, 1971

[21] Appl. No.: 190,539

[52] U.S. Cl. .................................................. 425/151
[51] Int. Cl. .................................................. B29f 1/00
[58] Field of Search .............. 425/151, 173, DIG. 45, 425/152, 153, 242, 450, 173; 49/70

[56] References Cited

UNITED STATES PATENTS

| 2,566,857 | 9/1951 | Sayre | 425/152 |
| 3,386,133 | 6/1968 | Weiner | 425/153 |
| 2,415,462 | 2/1947 | Cherry et al. | 425/DIG. 45 |

FOREIGN PATENTS OR APPLICATIONS

| 171,703 | 5/1958 | Netherlands | 425/DIG. 45 |

Primary Examiner—J. Spencer Overholser
Assistant Examiner—David S. Safran
Attorney—Roger B. McCormick

[57] ABSTRACT

An automatically operable device for opening the sliding safety gate or door of a plastic injection molding machine whenever the die or mold halves of the machine are opened so that the machine operator can have ready access to the area between the mold halves.

3 Claims, 4 Drawing Figures

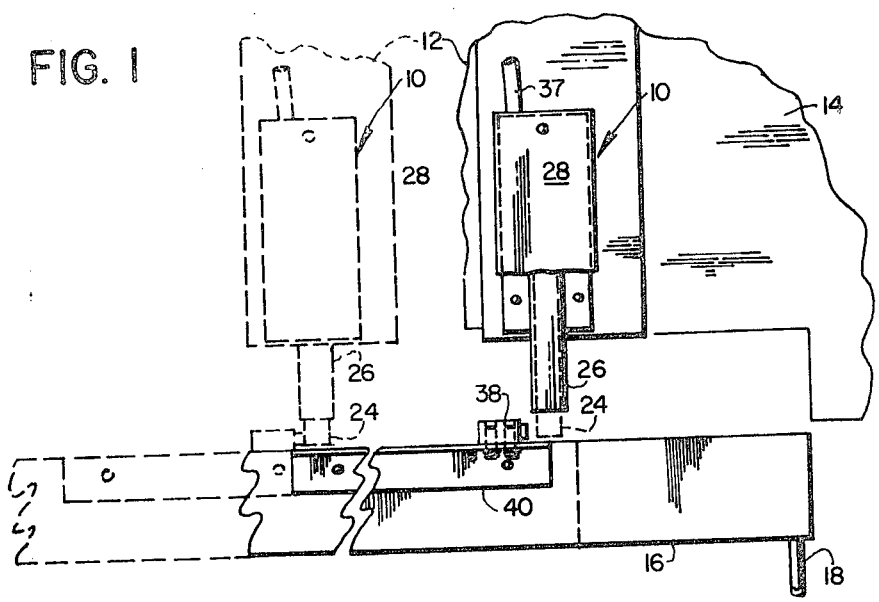
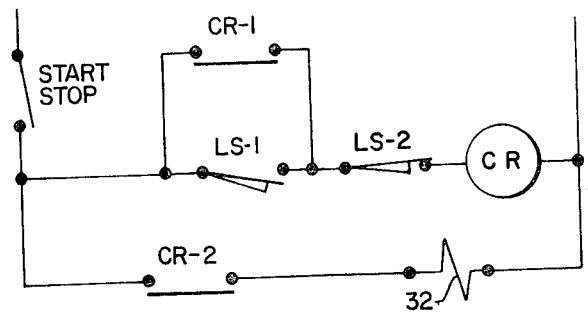
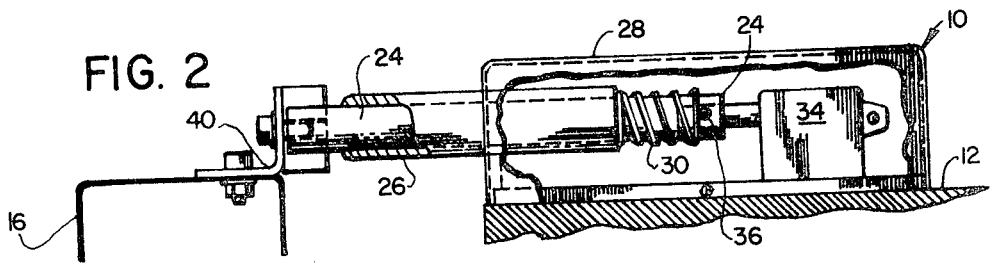
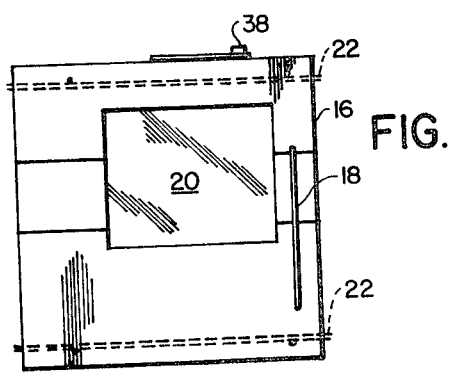

SOLENOID OPERATED DOOR OPENER FOR PLASTIC MOLDING MACHINES

BACKGROUND OF THE INVENTION

In plastic injection molding machines of the type having a pair of mold or die platens which are relatively movable between mold open and mold closed positions, many operations can be carried on without necessitating the opening and closing of the operator safety door with each cycle of machine operation or die platen movement. That is, the parts made during such operations merely drop out of the die halves as the platens are opened, and the machine can automatically be recycled for repetitive operation without operator effort involving access to the area adjacent the dies. There are other operations, however, wherein different parts are made on such machines, that require frequent operator access to the die area, perhaps with each part made or cycle of operation. This requires opening and closing of the safety gate or door, and the physical effort involved can be very tiring for the machine operator or man in attendance at the machine.

SUMMARY OF THE INVENTION

In accordance with the present invention an automatic door opener is provided with a control for its selective operation. That is, whenever desired, the automatic operator can be utilized to open the safety gate or door automatically each time the relatively movable die platens are separated and moved toward open position. This reduces the effort required of the machine attendant since he need only manually close the safety gate before the die platens are again moved toward the mold closing position.

The automatic door opener provided comprises a plunger which is carried by a movable die platen and which itself is movable between a normal retracted position and an extended position wherein it will engage the door in the closed position of the door to open it. A plunger operator is provided and it includes a spring urging the plunger to one of its said positions and a solenoid which when energized moves the plunger to the other of its said positions. A control for the plunger operator is also provided and includes a switch means operable responsive to movement of a movable die platen to cause said plunger to be extended only when the platens are moved relatively from mold closed position toward mold open position.

BRIEF DESCRIPTION OF THE DRAWINGS

FIG. 1 is a top plan view showing the automatic door opening device in position on a movable die platen so that it can be utilized to open the operator safety door.

FIG. 2 is a vertical view, partly in section, showing details of the door opener.

FIG. 3 is a front elevational view of the safety gate or door.

FIG. 4 is a wiring diagram showing the control for the door operator.

DETAILED DESCRIPTION OF THE PREFERRED EMBODIMENT

In FIG. 1, the automatic door operator provided in accordance with the present invention is indicated generally by the reference number 10 and is shown to be mounted on one platen 12 of a pair of relatively movable die or mold platens 12 and 14 in a plastic injection molding machine, the other elements of which are not shown. In most such machines, one die or mold platen, for example the platen 14, is fixed and the other platen, the platen 12, is movable toward and away from the fixed platen respectively to engage or close the mold halves and to open them. In the full line position of the operator 10, the die platens 12 and 14 are in their mold closed position, and in the broken line showing of the operator 10, the said die platens are in their mold open position. Thus, it will be seen that the die platen 12 is moved toward the left to open the mold halves and it is returned toward the right to close the die halves, carrying the operator 10 with it.

A conventional operator safety gate or door is shown at 16 in FIGS. 1 and 3 and it includes an elongated vertical handle 18 which the machine operator or attendant can grip for manual opening and closing of the door. The door is shown closed in FIG. 1, and it will be seen that in this closed position it prevents operator access from the front of the machine into the die or mold area. However, the operator can observe such area through a window 20 (FIG. 3) provided in the door. Access to the die area can only be obtained by moving the door 16 toward the left on tracks 22, 22, and the left hand or open position for the said door is indicated in broken lines in FIG. 1.

In the manufacture of some plastic parts, the machine may be operated automatically to cycle the die platens 12 and 14 many many times between their mold closed and mold open positions without any demand for operator access to the die area, and the operator door 16 will, of course, remain closed. However, in other machine operations wherein it is necessary to permit operator access each time the mold is opened it is desirable to bring the operator 10 into play so that the safety door 16 will be opened with the opening of the die sections. This reduces the manual effort of the machine attendant to the mere closing of the door.

An important element in the door operator 10 comprises a plunger 24 (FIGS. 1 and 3) which is movable between a normal retracted position (the full line position of FIG. 1) and an extended position (the full line position of FIG. 3). The said plunger 24 is movable axially in a sleeve 26 which is rigidly and horizontally supported to extend toward the door 16 in an operator housing 28 which is mounted upon the die platen 12 or the die or mold half carried thereby.

The operator 10 also includes a spring 30 and a solenoid 32, (FIG. 4) which is located within a solenoid housing 34 (FIG. 2). The said spring and solenoid are utilized, one to bias the plunger 24 to its normal retracted position and the other to bias the said plunger toward its extended position. Preferably, the spring is used to bias the plunger into its normal retracted position, and to this end the said spring is shown as surrounding the plunger 24 and seated against the inner end of the sleeve 26 in compression against a cross pin 36 carried by the plunger. The solenoid 32, when energized, will move the plunger toward the left as viewed in FIG. 2 to the extended position, but whenever the said solenoid de-energized the spring will return the plunger toward the right to its normal retracted position. The solenoid is connected by wiring 37 (FIG. 1) to electrical control circuitry which will be described.

Only when the plunger 24 is extended will it engage a door 16 to operate it. That is, only when the said plunger is extended or thrust outwardly from the sleeve 26 will it be positioned to engage the right-hand side of a strike block 38 mounted on the upper edge of the door 16 by a bracket 40 so as to project inwardly from said upper edge of the door. Therefore, the operator plunger 24 is effective only when extended and is effective only to engage the strike block 38 to effect opening movement of the door with left hand or opening movement of the die platen 12.

The operator 10 can be electrically controlled by several different circuit arrangements and that shown in FIG. 4 is merely illustrative of circuitry that might be employed. As shown in FIG. 4, the electrical control includes two lines L1 and L2 connected to a conventional source of electrical energy. A manually operable start-stop switch is included in one of the said lines so that it when closed will permit automatic control and operation of the operator 10 and when opened, will prevent utilization of the operator 10 and will cause the plunger 24 to remain in its retracted position.

When the start-stop switch is closed, and a normally open limit switch LS-1 is closed, a control relay CR is energized in a circuit between lines L1 and L2 which also includes a normally closed limit switch LS-2. When the control relay CR is energized, it closes normally open contacts CR-1 bridging the limit switch LS-1 so that the control relay CR will remain energized after the limit switch LS-1 again opens. The control relay CR when energized also closes contacts CR-2 in a circuit between lines L1 and L2 which includes the solenoid or coil 32.

In the arrangement of the control circuit shown in FIG. 4, the limit switch LS-1 will be engaged and closed so as to energize the control relay CR only responsive to movement of the die platen 12 away from the closed position of the die platens. That is, the limit switch LS-1 is arranged to be engaged and closed by the platen 12 during initial opening movement of the said platen. Therefore, the control relay CR will be energized to energize the solenoid 32 through the contact CR-2 and thus to thrust the plunger 24 into its extended or active position. This control condition will continue to exist during opening movement of the die platen 12 and after the limit switch LS-1 has been disengaged and again opens, because of the closed condition of the contacts CR-1. However, when the movable die platen 12 reaches its fully opened position, it will engage and open normally closed limit switch LS-2 and thus de-energize the control relay CR. When the control relay CR is de-energized, the solenoid coil 32 is also de-energized and the plunger 24 retracts. The control relay can only be again energized and the plunger 24 again extended when the movable die platen has returned to die closed position and again started movement toward open position.

I claim:

1. In a plastic injection molding machine of the type having a pair of mold or die platens which are relatively movable between mold open and mold closed positions and a normally manually operable door movable between open and closed positions adjacent the die platens respectively to permit and to prevent operator access to the die platen area, the improvement comprising a plunger carried by a movable die platen and which is movable between a normal retracted position and an extended position wherein it will engage said door in its closed position to open it, a plunger operator including a spring urging the plunger to one of its said positions and a solenoid which when energized moves the plunger to the other of its said positions, and an electrical control for said plunger operator including switch means operable responsive to movement of the said movable die platen to cause said plunger to be extended only when said platens are moved relatively from mold closed position toward mold open position.

2. In a plastic injection molding machine of the type having a pair of mold or die platens which are relatively movable between mold open and mold closed positions and a normally manually operable door movable between open and closed positions adjacent the die platens respectively to permit and to prevent operator access to the die platen area, the improvement comprising a plunger carried by a movable die platen and which is movable between a normal retracted position and an extended position wherein it will engage said door in its closed position to open it, a plunger operator including a spring urging the plunger to retracted position and a solenoid which when energized moves the plunger to its extended position, and an electrical control for said plunger operator including switch means operable responsive to movement of the said movable die platen to energize said solenoid when said platens are moved relatively from mold closed position and to de-energize said solenoid in the mold open position of said platens.

3. The improvement set forth in claim 2 in a molding machine wherein the door is slidable between open and closed positions substantially parallel to the path of relative movement between the die platens, and a strike block is mounted on said door for engagement by said plunger only when it is extended and then only on one side of said block to effect only opening sliding movement of said door by said extended plunger.

* * * * *